Aug. 8, 1933.  S. D. PALMER  1,921,320
GREASE RACK
Filed Aug. 3, 1931  3 Sheets-Sheet 1
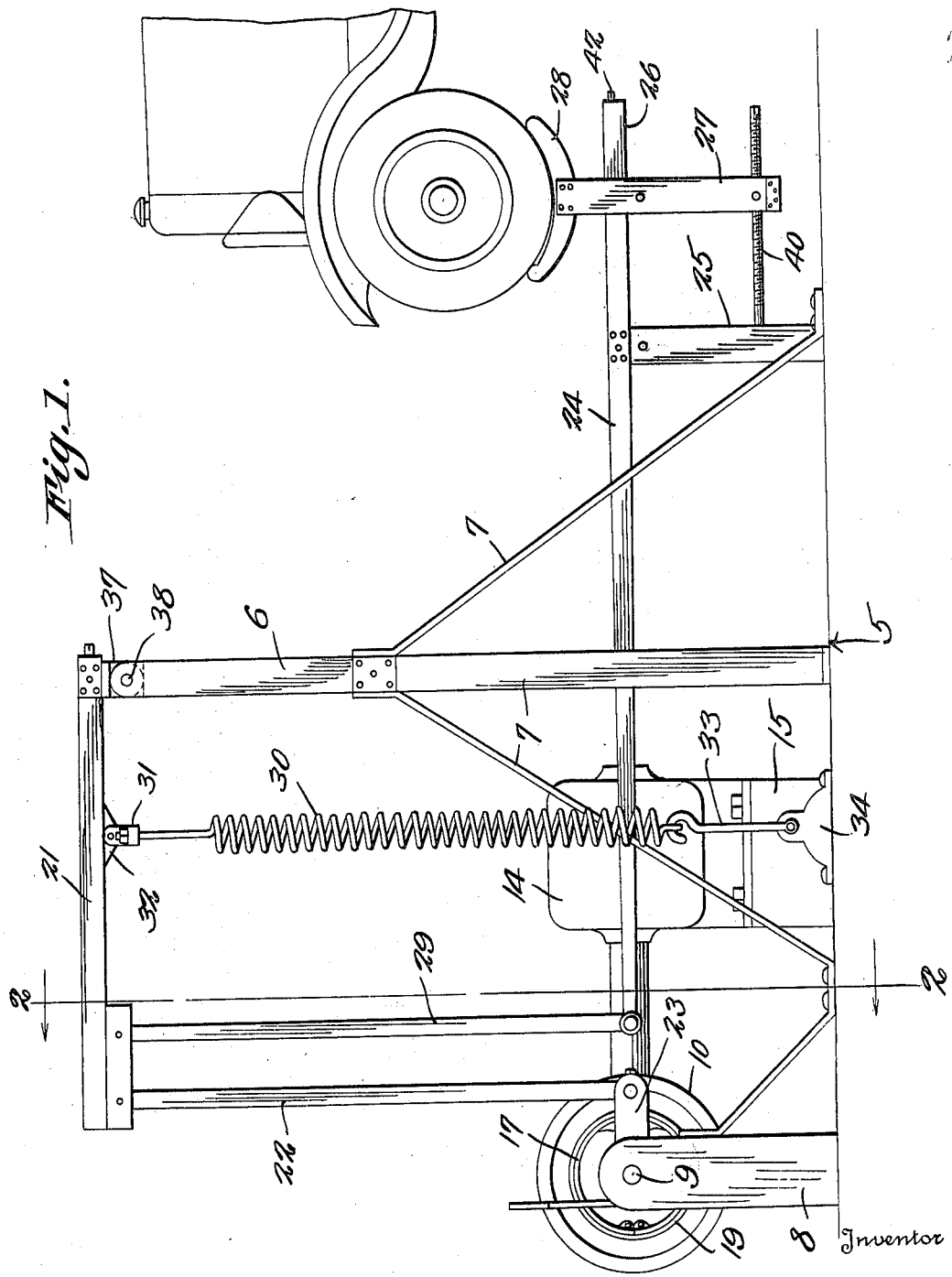
Inventor
S. D. Palmer
By C. A. Snow & Co.
Attorneys.

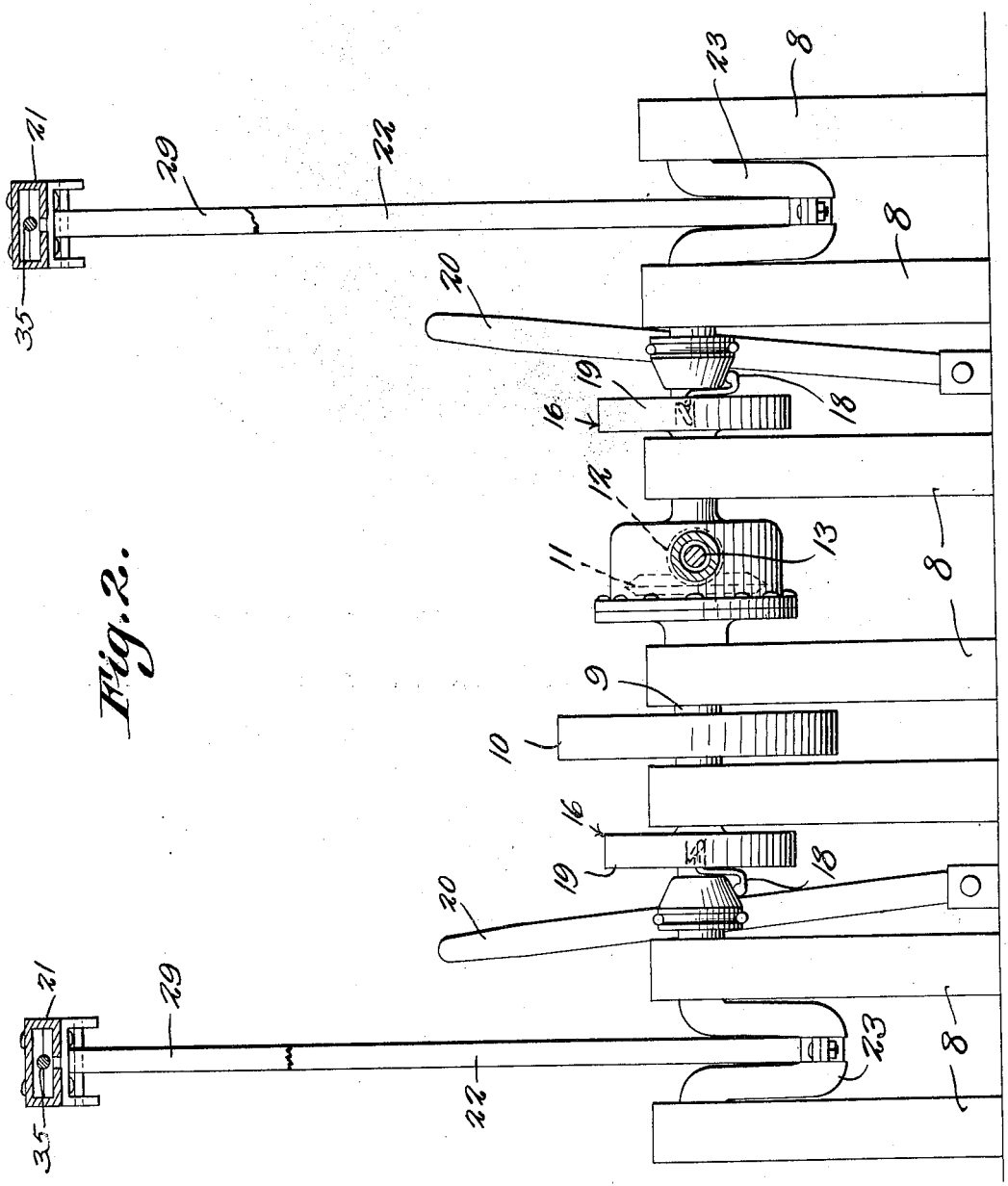

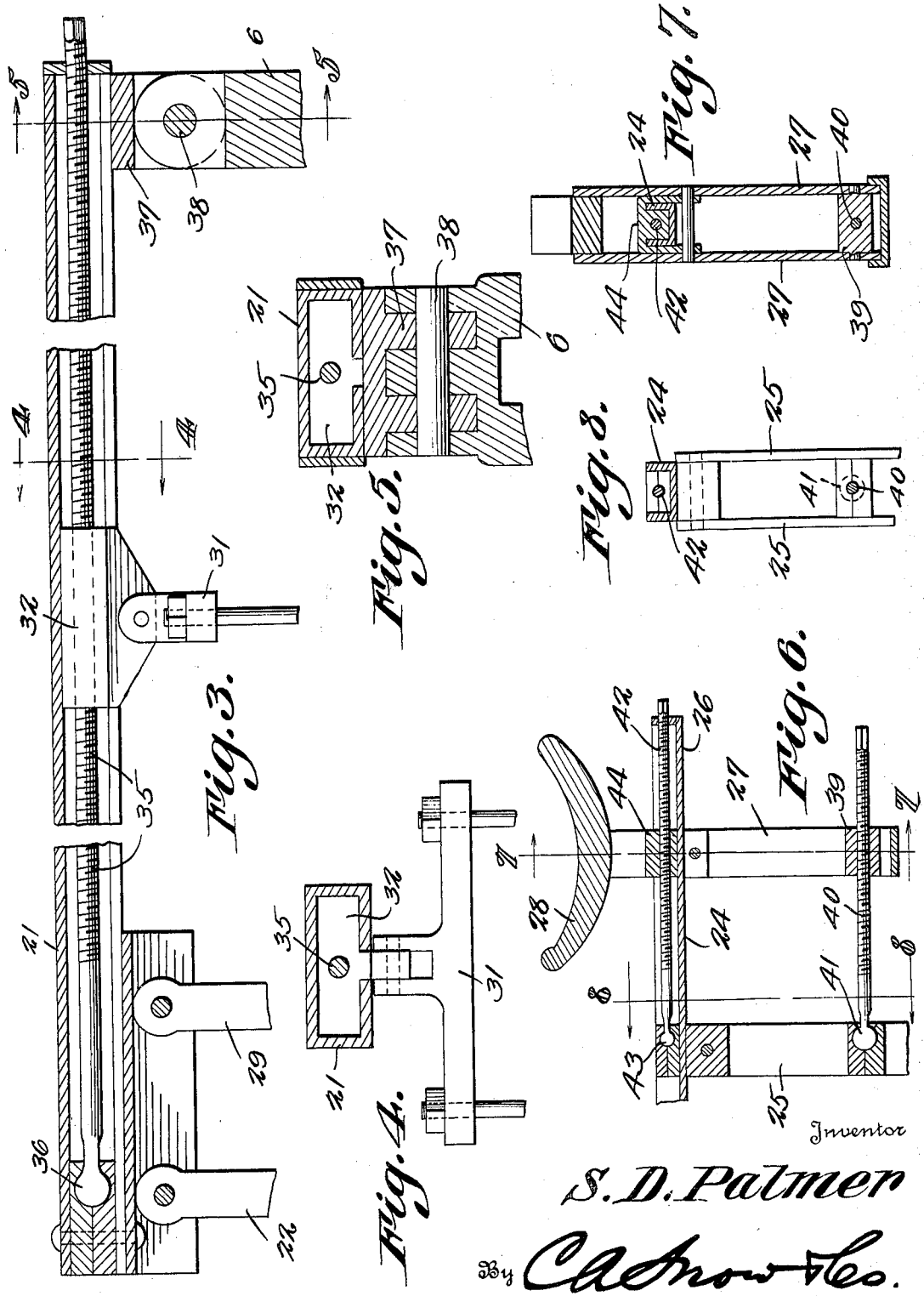

Patented Aug. 8, 1933

1,921,320

UNITED STATES PATENT OFFICE 1,921,320

GREASE RACK

Stanley D. Palmer, Joplin, Mo.

Application August 3, 1931. Serial No. 554,933

3 Claims. (Cl. 73—51)

This invention relates to a machine designed for testing motor vehicles for squeaks, rattles, loose parts or the like, the primary object of the invention being to provide means for moving the vehicle to locate objectional squeaks and rattles, without subjecting the vehicle to road tests.

Another object of the invention is the provision of a device of this character to be used in connection with the usual motor vehicle greasing lift now in common use, thereby eliminating the necessity of providing lifting means as a part of the device to elevate the motor vehicle to its position on the machine.

A further object of the invention is to provide a machine which may be adjusted for use in testing motor vehicles of various weights and lengths.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a machine constructed in accordance with the invention, and illustrating a vehicle positioned thereon.

Figure 2 is a sectional view taken on line 2—2 of Figure 1.

Figure 3 is a longitudinal sectional view through the uppermost part of the frame of the machine.

Figure 4 is a sectional view taken on line 4—4 of Figure 3.

Figure 5 is a sectional view taken on line 5—5 of Figure 3.

Figure 6 is a vertical sectional view through the adjustable support on which the front wheels of the vehicle rest, during the testing operation.

Figure 7 is a sectional view taken on line 7—7 of Figure 6.

Figure 8 is a sectional view taken on line 8—8 of Figure 6.

Referring to the drawings in detail; the machine comprises a frame indicated generally by the reference character 5, the frame comprising spaced uprights 6, spaced appreciable distances apart, the uprights being arranged in pairs, at each side of the machine.

Braces 7 connect with the uprights, and provide means for holding the uprights rigid. Posts 8 also form a part of the frame structure, and are provided with bearings, in which the crank shaft 9 is mounted, the crank shaft being supplied with a fly wheel 10, to hold the shaft in balance at all times.

The shaft 9 is supplied with a pinion 11 that is in mesh with the pinion 12, carried on one end of the drive shaft 13, the drive shaft being connected with the shaft of the motor 14, which is supported on the base 15.

The crank shaft 9 embodies a central section and lateral section, the lateral section being clutched to the central section by means of the clutch members 16, which are in the form of split bands 17, there being provided spreaders 18 disposed between the ends of the split bands, to move the split bands into engagement with the drums 19, mounted on the inner sections of the crank shaft and forming a part of the clutch members.

Clutch levers 20 are provided for operating the spreaders 18, so that the clutch members may be readily thrown into and out of operation, clutching either end of the crank shaft to the central section thereof, or both ends to the central section thereof, at the will of the operator.

Pivotally mounted between the upper ends of each pair of spaced uprights 6, is a horizontal beam 21 to which the connecting rods 22 are pivotally connected, the rods 22 having connection with the cranks 23 of the crank shaft 9.

Thus it will be seen that due to this construction, rotary movement of the crank shaft will impart vertical movement to the connecting rods 22 and horizontal beams 21.

The reference character 24 designates supporting bars that are pivotally mounted at the upper ends of the posts 25, portions of the supporting bars extending forwardly beyond the posts 25, as at 26, where they provide a support for the bars 27, formed with curved supports 28, in which the wheels at the front or rear of the motor vehicle, rest while a test is being made.

The opposite ends of these supporting bars 24 extend to positions near the crank shaft 9, where they have pivotal connection with the links 29, that in turn have pivotal connection with the horizontal beams 21.

Movement of the horizontal beams 21, is restricted by means of the coiled springs 30 which have their upper ends connected to the bars 31 that in turn are pivotally connected with the guides 32, the lower ends of the coiled springs 30 being connected with the links 33, that are pivotally connected with the brackets 34 which are secured to the support on which the machine is mounted.

These guides 32 are formed with threaded bores that accommodate the adjusting screws 35 formed with heads 36 mounted in sockets formed in the horizontal beams 21, as clearly shown by Figure 3 of the drawings.

When it is desired to adjust the tension of the springs, to adapt the machine for use in testing heavier or lighter vehicles, the adjusting screws 35 are rotated to move the guides 32 longitudinally of the beams 21. The forward ends of the beams 21 rest on the pivot members 37 that extend into openings at the upper ends of the uprights 6, where the pivot members are pivotally secured to the uprights 6, by means of the pivot pins 38.

The bars 27 carry blocks 39 formed with threaded bores, to receive the adjusting screws 40, which adjusting screws have heads 41 fitted in sockets formed in the posts 25.

These adjusting screws 40 adjust the lower ends of the bars 27. The upper ends of the bars 27 are adjusted by means of the adjusting screws 42 that have heads 43 fitted in socket members at the upper ends of the posts 25, the bars 27 having blocks 44 formed with threaded bores to receive the adjusting screws 42.

It is, of course, understood that a stationary rest not shown is provided for the reception of the wheels at one end of the vehicle, while the wheels at the opposite end of the vehicle rest on the supports 28.

It is therefore obvious that due to the construction of the bars 27, the supports 28 may be adjusted horizontally and with respect to the stationary supports, so that the vertical movement of the supports 28 may be varied.

As before stated, this machine is used in conjunction with the usual free wheel rotary lift of the type now in common use, whereby the motor vehicle to be tested may be lifted to a position on the machine.

In the use of the device, the wheels of the vehicle to be tested, are positioned on the machine, and held in position by any suitable clamping means not shown.

The motor 14 is now set in motion, and as the motor rotates, rotary movement is transmitted to the crank shaft 9, resulting in a reciprocatory movement of the beams 21, which movement is imparted to the supporting bars 24, moving the vehicle to simulate the movements of the vehicle in passing over irregularities in a road surface.

Noises caused by poor lubrication or loose parts, may be readily detected, and remedied.

Should it be desired to hold one side of the vehicle stationary while the other side is moving, this may be done by manipulating the clutch members 16.

In view of the foregoing detailed description, a further detailed description of the operation of the device is believed to be unnecessary.

I claim:

1. A testing machine comprising supporting posts, supporting bars pivotally mounted at the upper ends of the supporting posts at points intermediate the ends of the supporting bars, wheel supports mounted on the supporting bars for supporting the wheels at one end of a vehicle under test, and means for rocking the supporting bars simultaneously or independently of each other.

2. A testing machine comprising pivoted supporting bars, wheel rests on the supporting bars in which the wheels at one end of a vehicle are positioned, and means for rocking the supporting bars simultaneously or independently of each other to agitate the vehicle supported thereon.

3. A testing machine comprising a frame embodying spaced uprights, horizontal beams pivotally mounted at the upper ends of the uprights, supporting bars, posts on which the supporting bars are pivotally mounted, means for transmitting movement of the horizontal beams to the supporting bars, wheel rests on the supporting bars, in which the wheels at one end of a vehicle are positioned, and means for operating the beams for oscillating the bars vertically to rock the wheels of the vehicle positioned on the wheel rests.

STANLEY D. PALMER.